United States Patent
Bai et al.

(10) Patent No.: US 12,432,757 B2
(45) Date of Patent: Sep. 30, 2025

(54) TRANSMISSION CONFIGURATION INDICATOR STATE TYPES FOR SOUNDING REFERENCE SIGNAL AS SOURCE REFERENCE SIGNAL

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 17/644,702

(22) Filed: Dec. 16, 2021

(65) Prior Publication Data

US 2022/0248444 A1   Aug. 4, 2022

Related U.S. Application Data

(60) Provisional application No. 63/199,904, filed on Feb. 1, 2021.

(51) Int. Cl.
| | |
|---|---|
| *H04W 72/21* | (2023.01) |
| *H04B 7/06* | (2006.01) |
| *H04B 7/08* | (2006.01) |
| *H04L 5/00* | (2006.01) |
| *H04W 72/51* | (2023.01) |

(52) U.S. Cl.
CPC .......... *H04W 72/21* (2023.01); *H04B 7/0628* (2013.01); *H04B 7/088* (2013.01); *H04L 5/0048* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 11,316,636 B2* | 4/2022 | Choi | H04B 7/06 |
| 2019/0387579 A1* | 12/2019 | Pao | H04W 88/06 |
| 2020/0045569 A1* | 2/2020 | Seo | H04W 72/23 |
| 2020/0092814 A1* | 3/2020 | Zhou | H04W 52/0235 |
| 2020/0314880 A1* | 10/2020 | Cirik | H04L 5/0053 |
| 2020/0344742 A1* | 10/2020 | Chen | H04W 72/046 |
| 2020/0374853 A1* | 11/2020 | Guan | H04W 24/08 |
| 2020/0413390 A1* | 12/2020 | Rahman | H04L 5/0051 |
| 2021/0022152 A1* | 1/2021 | Yang | H04L 5/0048 |
| 2021/0127399 A1* | 4/2021 | Kou | H04W 24/08 |
| 2021/0227530 A1* | 7/2021 | Farag | H04L 5/0091 |
| 2021/0337525 A1* | 10/2021 | Rahman | H04L 5/0094 |
| 2021/0410132 A1* | 12/2021 | Xu | H04B 7/0695 |

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, a UE capability report that indicates which transmission configuration indicator (TCI) state types the UE is able to support when using a sounding reference signal (SRS) as a source reference signal for a TCI state. The UE may receive, from the base station, a configuration for one or more TCI state types for the SRS as the source reference signal based at least in part on transmitting the UE capability report. Numerous other aspects are described.

30 Claims, 9 Drawing Sheets

(56) References Cited

U.S. PATENT DOCUMENTS

| | | | | |
|---|---|---|---|---|
| 2022/0104043 A1* | 3/2022 | Farag | ................... | H04W 24/10 |
| 2022/0174509 A1* | 6/2022 | Noh | ................... | H04B 7/15528 |
| 2022/0224479 A1* | 7/2022 | He | ................... | H04L 5/0044 |
| 2022/0394548 A1* | 12/2022 | Huang | ................... | H04W 72/23 |
| 2023/0370227 A1* | 11/2023 | Liu | ................... | H04B 7/0639 |

* cited by examiner

US 12,432,757 B2

TRANSMISSION CONFIGURATION INDICATOR STATE TYPES FOR SOUNDING REFERENCE SIGNAL AS SOURCE REFERENCE SIGNAL

CROSS-REFERENCE TO RELATED APPLICATION

This Patent application claims priority to U.S. Provisional Patent Application No. 63/199,904, filed on Feb. 1, 2021, entitled "TRANSMISSION CONFIGURATION INDICATOR STATE TYPES FOR SOUNDING REFERENCE SIGNAL AS SOURCE REFERENCE SIGNAL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating transmission control indicator state types for a sounding reference signal that is used as a source reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, a UE capability report that indicates which transmission configuration indicator (TCI) state types the UE is able to support when using a sounding reference signal (SRS) as a source reference signal for a TCI state, and receiving, from the base station, a configuration for one or more TCI state types for the SRS as the source reference signal based at least in part on transmitting the UE capability report.

In some aspects, a method of wireless communication performed by a base station includes receiving, from a UE, a UE capability report that indicates which TCI state types the UE is able to support when using an SRS as a source reference signal for a downlink beam, and transmitting a configuration for one or more TCI state types for the SRS as the source reference signal based at least in part on the UE capability report.

In some aspects, a UE for wireless communication includes a memory and one or more processors coupled to the memory, the one or more processors configured to transmit, to a base station, a UE capability report that indicates which TCI state types the UE is able to support when using an SRS as a source reference signal for a TCI state, and receive, from the base station, a configuration for one or more TCI state types for the SRS as the source reference signal based at least in part on transmitting the UE capability report.

In some aspects, a base station for wireless communication includes a memory and one or more processors coupled to the memory, the or more processors configured to receive, from a UE, a UE capability report that indicates which TCI state types the UE is able to support when using an SRS as a source reference signal for a downlink beam, and transmit a configuration for one or more TCI state types for the SRS as the source reference signal based at least in part on the UE capability report.

In some aspects, a non-transitory computer-readable medium storing a set of instructions for wireless communication includes one or more instructions that, when executed by one or more processors of a UE, cause the UE to transmit, to a base station, a UE capability report that indicates which TCI state types the UE is able to support when using an SRS as a source reference signal for a TCI state, and receive, from the base station, a configuration for one or more TCI state types for the SRS as the source reference signal based at least in part on transmitting the UE capability report.

In some aspects, a non-transitory computer-readable medium storing a set of instructions for wireless communication includes one or more instructions that, when executed by one or more processors of a base station, cause the base station to receive, from a UE, a UE capability report that indicates which TCI state types the UE is able to support when using an SRS as a source reference signal for a downlink beam, and transmit a configuration for one or more TCI state types for the SRS as the source reference signal based at least in part on the UE capability report.

In some aspects, an apparatus for wireless communication includes means for transmitting, to a base station, a UE capability report that indicates which TCI state types the UE is able to support when using an SRS as a source reference signal for a TCI state, and means for receiving, from the base station, a configuration for one or more TCI state types for the SRS as the source reference signal based at least in part on transmitting the UE capability report.

In some aspects, an apparatus for wireless communication includes means for receiving, from a UE, a UE capability report that indicates which TCI state types the UE is able to support when using an SRS as a source reference signal for a downlink beam, and means for transmitting a configuration for one or more TCI state types for the SRS as the source reference signal based at least in part on the UE capability report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
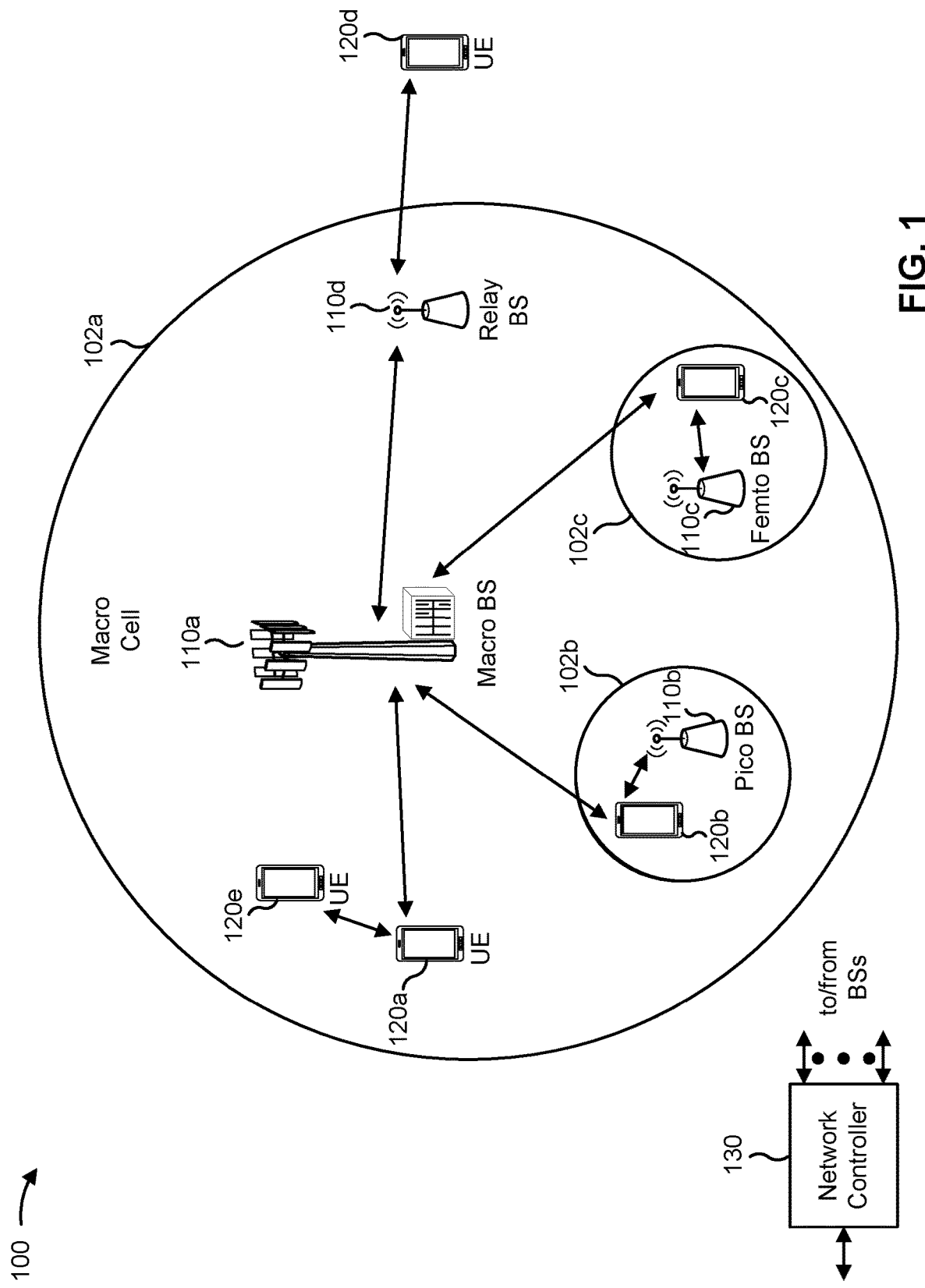
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly via a wireless or wireline backhaul communication link.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
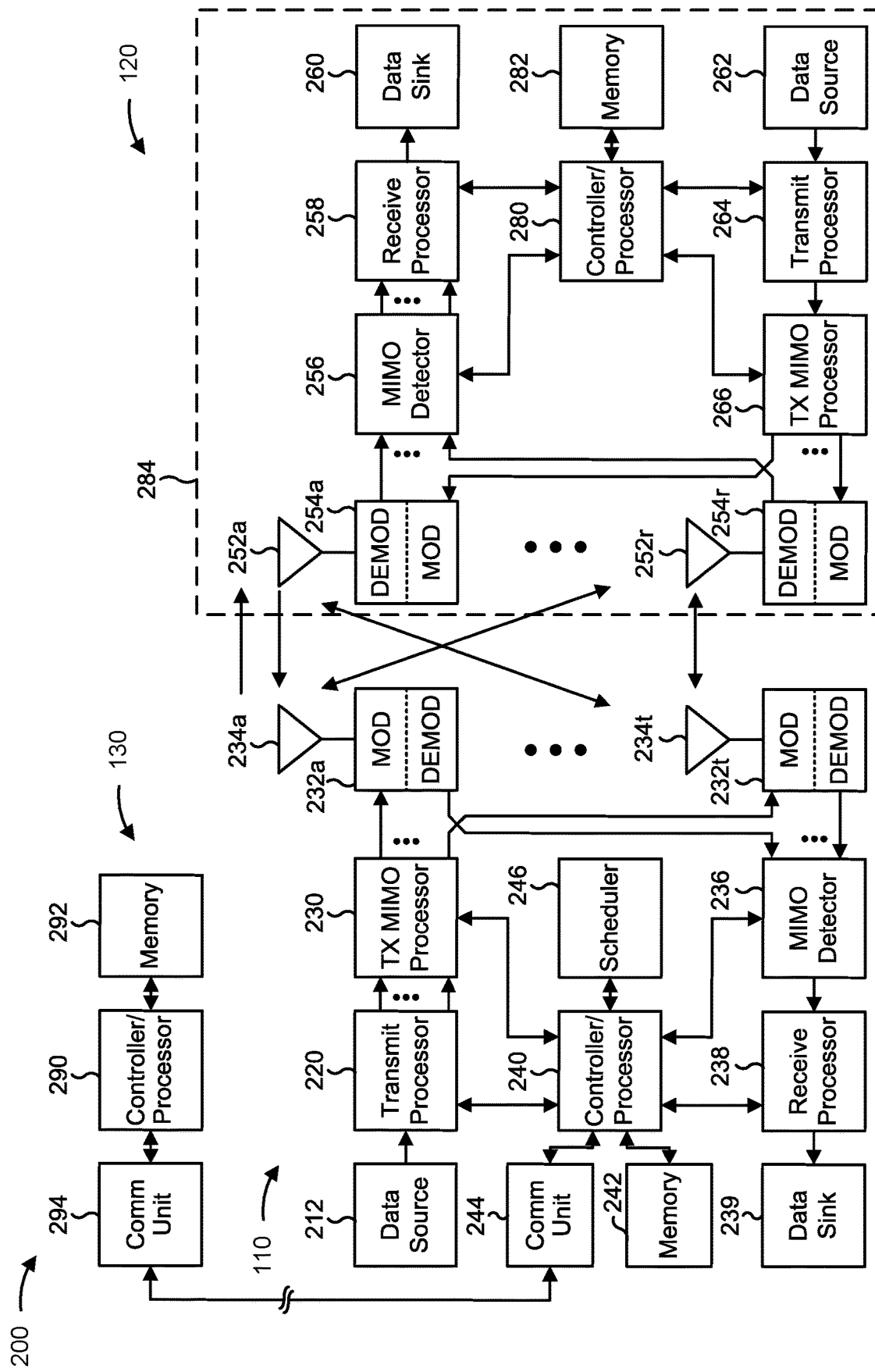
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

One or more antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., with reference to FIGS. 3-9).

Controller/processor 240 of base station 110, controller/processor 280 of UE 120, and/or any other component(s) of FIG. 2 may perform one or more techniques associated with indicating transmission control indicator (TCI) state types for a sounding reference signal (SRS) that is used as a source reference signal, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 includes means for transmitting, to a base station, a UE capability report that indicates which TCI state types the UE is able to support when using an SRS as a source reference signal for a TCI state, and/or means for receiving, from the base station, a configuration for one or more TCI state types for the SRS as the source reference signal based at least in part on transmitting the UE capability report. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, base station 110 includes means for receiving, from a UE, a UE capability report that indicates which TCI state types the UE is able to support when using an SRS as a source reference signal for a downlink beam, and/or means for transmitting a configuration for one or more TCI state types for the SRS as the source reference signal based at least in part on the UE capability report. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
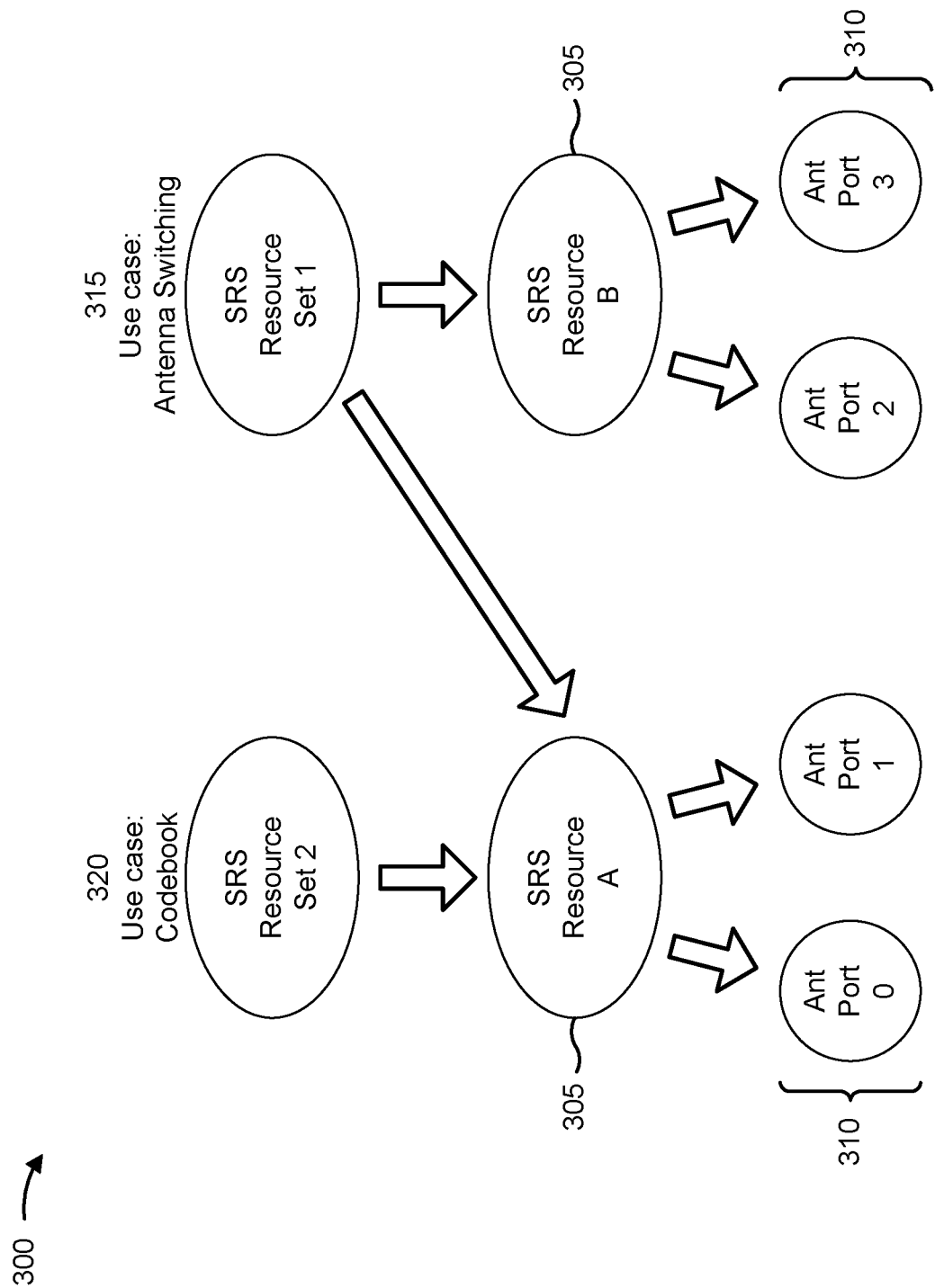
FIG. 3 is a diagram illustrating an example of sounding reference signal (SRS) resource sets, in accordance with the present disclosure.

FIG. 3 is a diagram illustrating an example 300 of SRS resource sets, in accordance with the present disclosure.

An uplink reference signal may include an SRS, a DMRS, or a phase tracking reference signal, among other examples. An SRS may carry information used for uplink channel estimation, which may be used for scheduling, link adaptation, precoder selection, or beam management, among other examples. A base station 110 may configure one or more SRS resource sets for a UE 120, and the UE 120 may transmit SRSs on the configured SRS resource sets. An SRS resource set may have a configured usage, such as uplink channel state information (CSI) acquisition, downlink CSI acquisition for reciprocity-based operations, uplink beam management, among other examples. Base station 110 may measure the SRSs, may perform channel estimation based at least in part on the measurements, and may use the SRS measurements to configure communications with UE 120.

Base station 110 may configure UE 120 with one or more SRS resource sets to allocate resources for SRS transmissions by UE 120. For example, a configuration for SRS resource sets may be indicated in a radio resource control (RRC) message (e.g., an RRC configuration message or an RRC reconfiguration message). As shown by reference number 305, an SRS resource set may include one or more resources (e.g., shown as SRS resources), which may include time resources and/or frequency resources (e.g., a slot, a symbol, a resource block, and/or a periodicity for the time resources).

As shown by reference number 310, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, base station 110 may use an antenna switching SRS (e.g., an SRS transmitted using a resource of an antenna switching SRS resource set) to acquire downlink CSI (e.g., to determine a downlink precoder to be used to communicate with UE 120).

A codebook SRS resource set may be used to indicate uplink CSI when base station 110 indicates an uplink precoder to UE 120. For example, when base station 110 is configured to indicate an uplink precoder to UE 120 (e.g., using a precoder codebook), base station 110 may use a codebook SRS (e.g., an SRS transmitted using a resource of a codebook SRS resource set) to acquire uplink CSI (e.g., to determine an uplink precoder to be indicated to UE 120 and used by UE 120 to communicate with base station 110). In some aspects, virtual ports (e.g., a combination of two or more antenna ports) with a maximum transmit power may be supported at least for a codebook SRS.

A non-codebook SRS resource set may be used to indicate uplink CSI when UE 120 selects an uplink precoder (e.g., instead of base station 110 indicated an uplink precoder to be used by UE 120. For example, when UE 120 is configured to select an uplink precoder, base station 110 may use a non-codebook SRS (e.g., an SRS transmitted using a resource of a non-codebook SRS resource set) to acquire uplink CSI. In this case, the non-codebook SRS may be precoded using a precoder selected by UE 120 (e.g., which may be indicated to base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC CE)). An aperiodic SRS resource may be triggered dynamically, such as via DCI (e.g., UE-specific DCI or group common DCI) or a MAC CE.

In some aspects, UE 120 may be configured with a mapping between SRS ports (e.g., antenna ports) and corresponding SRS resources. UE 120 may transmit an SRS on a particular SRS resource using an SRS port indicated in the configuration. In some aspects, an SRS resource may span N adjacent symbols within a slot (e.g., where N equals 1, 2, or 4). UE 120 may be configured with X SRS ports (e.g., where X≤4). In some aspects, each of the X SRS ports may mapped to a corresponding symbol of the SRS resource and used for transmission of an SRS in that symbol.

As shown in FIG. 3, in some aspects, different SRS resource sets indicated to UE 120 (e.g., having different use cases) may overlap (e.g., in time and/or in frequency, such as in the same slot). For example, as shown by reference number 315, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 320, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, UE 120 may not transmit codebook SRSs in SRS Resource B (e.g., the second time-frequency resource) using antenna port 2 and antenna port 3.

As indicated above, FIG. 3 is provided as an example. Other examples may differ from what is described with regard to FIG. 3.

Figure 4:
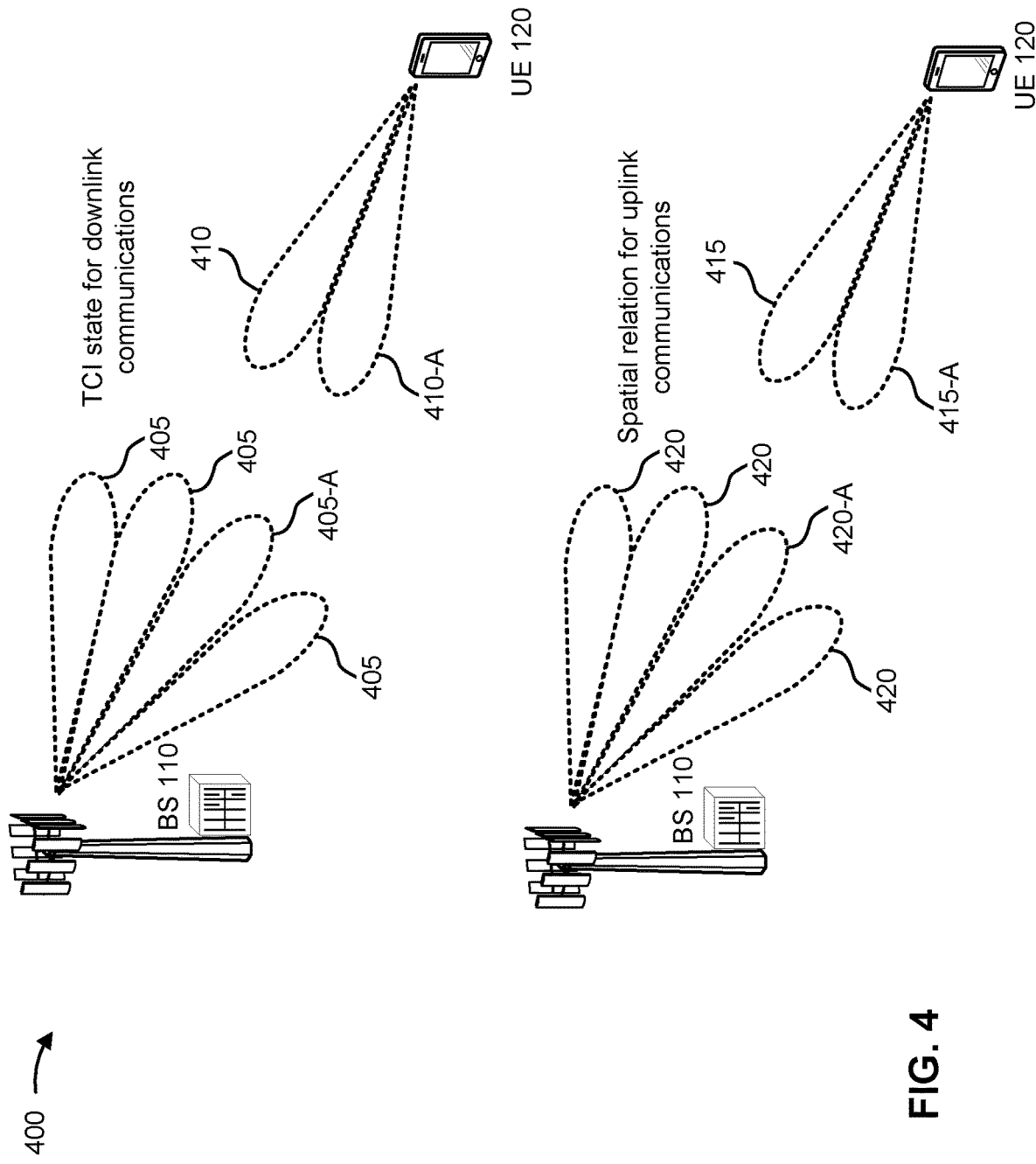
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

Base station 110 may transmit to UEs 120 located within a coverage area of base station 110. Base station 110 and UE 120 may be configured for beamformed communications, where base station 110 may transmit in the direction of UE 120 using a directional BS transmit beam, and UE 120 may receive the transmission using a directional UE receive beam. Each BS transmit beam may have an associated beam ID, beam direction, or beam symbols, among other examples. Base station 110 may transmit downlink communications via one or more BS transmit beams 405.

UE 120 may attempt to receive downlink transmissions via one or more UE receive beams 410, which may be configured using different beamforming parameters at receive circuitry of UE 120. UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, UE 120 may transmit an indication of which BS transmit beam 405 is identified by UE 120 as a preferred BS transmit beam, which base station 110 may select for transmissions to UE 120. UE 120 may thus attain and maintain a beam pair link (BPL) with base station 110 for downlink communications (for example, a combination of BS transmit beam 405-A and UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and UE 120 may indicate a preferred BS transmit beam 405 by transmitting uplink transmissions in resources of the SSB that are associated with preferred BS transmit beam 405. A particular SSB may have an associated TCI state (for example, for an antenna port or for beamforming). Base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at UE 120. Thus, UE 120 may select a corresponding UE receive beam 410 from a set of BPLs based at least in part on base station 110 indicating a BS transmit beam 405 via a TCI indication.

Base station 110 may maintain a set of activated TCI states for downlink shared channel transmissions and a set of activated TCI states for downlink control channel transmissions. The set of activated TCI states for downlink shared channel transmissions may correspond to beams that base station 110 uses for downlink transmission on a physical downlink shared channel (PDSCH). The set of activated TCI states for downlink control channel communications may correspond to beams that base station 110 may use for downlink transmission on a physical downlink control channel (PDCCH) or in a control resource set (CORESET). UE 120 may also maintain a set of activated TCI states for receiving the downlink shared channel transmissions and the CORESET transmissions. If a TCI state is activated for UE 120, then UE 120 may have one or more antenna configurations based at least in part on the TCI state, and UE 120 may not need to reconfigure antennas or antenna weighting configurations. In some examples, the set of activated TCI states (for example, activated PDSCH TCI states and activated CORESET TCI states) for UE 120 may be configured by a configuration message, such as an RRC message.

Similarly, for uplink communications, UE 120 may transmit in the direction of base station 110 using a directional UE transmit beam, and base station 110 may receive the transmission using a directional BS receive beam. Each UE transmit beam may have an associated beam ID, beam direction, or beam symbols, among other examples. UE 120 may transmit uplink communications via one or more UE transmit beams 415.

Base station 110 may receive uplink transmissions via one or more BS receive beams 420. Base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, base station 110 may transmit an indication of which UE transmit beam 415 is identified by base station 110 as a preferred UE transmit beam, which base station 110 may select for transmissions from UE 120. UE 120 and base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

When a PDCCH schedules a PDSCH communication, the TCI state for the scheduled PDSCH communication is indicated to UE 120, such that UE 120 knows which base station (e.g., gNB) the PDSCH communication is transmitted from and how to receive the PDSCH communication. UE 120 may use an SSB or a CSI-RS from base station 110 as a source reference signal for determining the TCI state. The TCI state may be used, via QCL, to determine a spatial filter that corresponds to the TCI state, in order to receive the PDSCH communication. In other words, if a CSI-RS/SSB is used as a source reference signal of a TCI state of a particular TCI state type, such as QCL-Type D, UE 120 may receive the PDSCH communication using the same receive spatial filter that was used to receive the source CSI-RS/SSB.

In some enhancement scenarios, an SRS may be used as a source reference signal of a TCI state. If the TCI state is for a downlink channel, UE 120 may use the same transmit beam used for the SRS as the source reference signal to receive the downlink channel. If the TCI state is for an uplink channel, UE 120 may use the same transmit beam used for the SRS as the source reference signal to transmit the uplink channel. If the SRS serves as a QCL-Type D reference signal for downlink TCI, the SRS may have at least one QCL-Type A/B/C source reference signal, such as CSI-RS or SSB, in the same downlink TCI. Note that QCL-Type D may indicate a spatial receive parameter. QCL-Type A may indicate a Doppler shift, a Doppler spread, an average delay, and/or a delay spread. QCL-Type B may indicate a Doppler shift, and/or a Doppler spread. QCL-Type C may indicate a Doppler shift, and/or an average delay. QCL-Types A, B, and C may be related to channel parameters that UE 120 assumes for decoding, and UE 120 may usually estimate such parameters from downlink reference signals. Therefore, UE 120 may need another downlink reference signal Type A/B/C.

UE 120 may be able to support SRS as a source reference signal. However, this adds complexity. In some scenarios, UE 120 may not be able to support SRS as a source reference signal. The support of SRS as a source reference signal may depend on a UE capability for beam correspondence. Due to a mismatch of transmit and receive components and a lack of calibration, beam correspondence may not always be assumed by UE 120. That is, knowing an uplink spatial filter for an SRS may not be sufficient for determining a downlink spatial filter to receive a downlink reference signal corresponding to the same receive beam of the SRS. The added complexity of using SRS as a source reference signal, and beam correspondence issues, may degrade communications. Degraded communications may waste power, processing resources, and/or signaling resources.

As indicated above, FIG. 4 is provided as an example. Other examples may differ from what is described with respect to FIG. 4.

Figure 5:
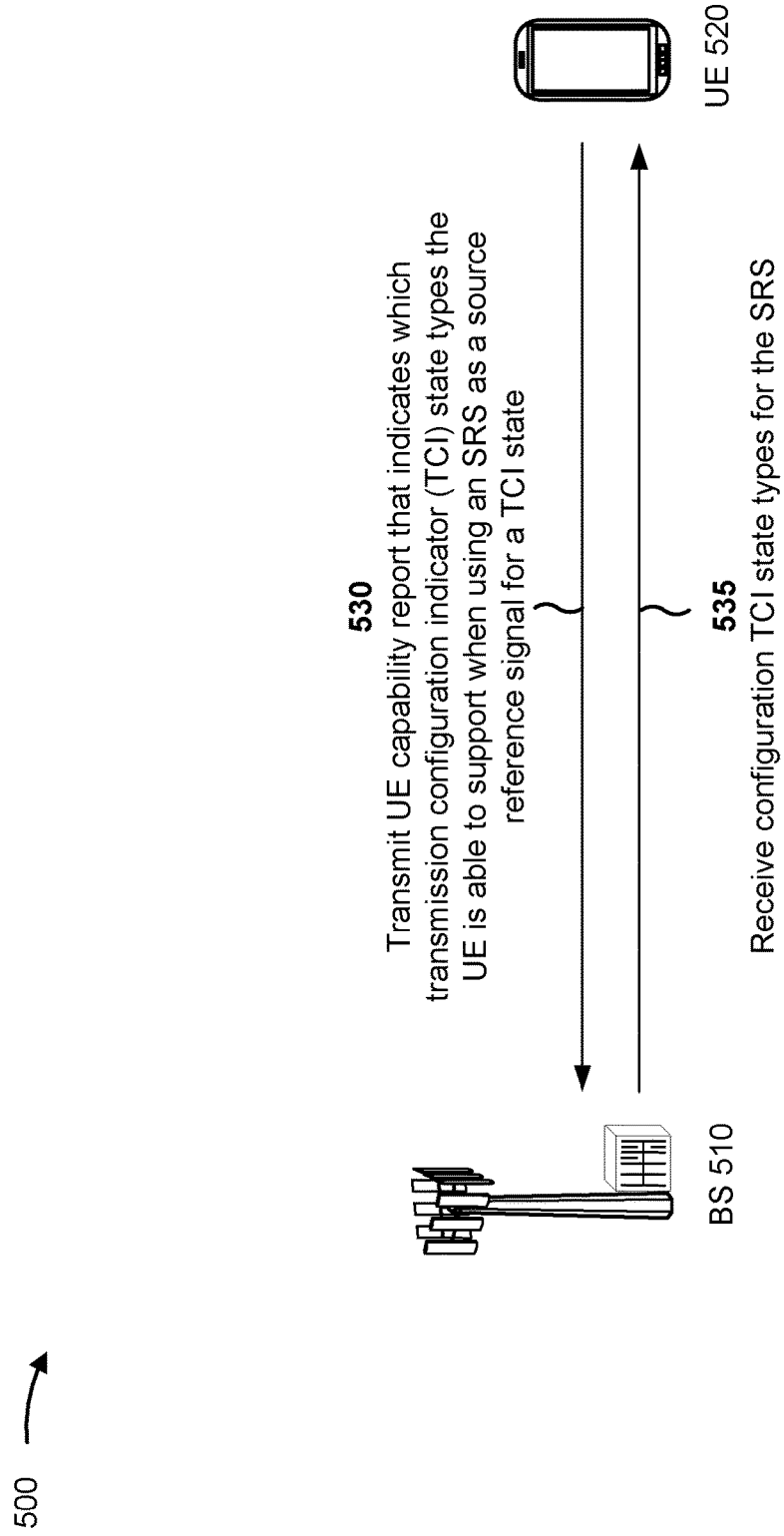
FIG. 5 is a diagram illustrating an example of indicating transmission configuration indicator state types for an SRS that is used as a source reference signal, in accordance with the present disclosure.

FIG. 5 is a diagram illustrating an example 500 of indicating TCI state types for an SRS that is used as a source reference signal, in accordance with the present disclosure. FIG. 5 shows a BS 510 (e.g., a BS 110 depicted in FIGS. 1 and 2) and a UE 520 (e.g., a UE 120 depicted in FIGS. 1 and 2) that may communicate with each other on a downlink or an uplink in a wireless network such as wireless network 100 depicted in FIG. 1.

According to various aspects described herein, a UE may indicate a UE capability for supporting an SRS as a source reference signal for a TCI state. The UE may indicate TCI state types that the UE can support for the SRS as the source reference signal. The UE may indicate support for no TCI state types, specific TCI state types, or for all of the TCI state types. The UE may use a beam correspondence report to indicate support for all of the TCI state types. In some aspects, the UE may indicate a TCI state type to be used for uplink only or for both uplink and downlink. The UE may indicate TCI state types for a single channel/beam or common beam TCI state types. The UE may indicate the UE capability in a UE capability report, which may be transmitted in an RRC message (e.g., as part of a UE capability exchange). The network may then configure a source reference signal of the TCI states at the UE based at least in part on the UE capability report. As a result of improved beam correspondence, the UE and the base station may avoid degraded communications, which conserves power, processing resources, and/or signaling resources.

For example, as shown by reference number 530, UE 520 may transmit a UE capability report that indicates which TCI state types UE 520 is able to support when using an SRS as a source reference signal for a TCI state. The TCI state types may include Type 1, Type 2, Type 3, Type 4, and/or Type 5. Type 1 may indicate a common beam between UE 520 and BS 510 for one or more downlink channels or reference signals and one or more uplink channels or reference signals. Type 2 may indicate a common beam between UE 520 and BS 510 for more than one downlink channel or reference signal. Type 3 may indicate a common beam between UE 520 and BS 510 for more than one uplink channel or reference signal. Type 4 may indicate a beam between UE 520 and BS 510 for a single downlink channel or reference signal. Type 5 may indicate a beam between UE 520 and BS 510 for a single uplink channel or reference signal.

In some aspects, if UE 520 has beam correspondence, then UE 520 may be able to support the SRS as the source reference signal for all TCI state types. For example, if UE 520 indicates full beam correspondence in a beam correspondence report, then UE 520 is able to support using the SRS as the source reference signal for all types of TCI states. Otherwise, UE 520 may support the SRS as the source reference signal for only uplink TCI state types and uplink beam indications, or for no TCI state types at all.

In some aspects, UE 520 may indicate which options of SRS the UE can use as a source reference signal of a TCI state. The options may include one or more of antenna switching, codebook, non-codebook, and/or beam management, such as described in connection with FIG. 3. If the SRS is used with multiple options, one of the options may at least be beam management.

A source reference signal of a TCI state may be used to derive uplink spatial filters of an associated uplink transmission and/or of a new SRS resource set. In some aspects, a TCI state may be included in the configuration of one or more SRS resource sets, where the uplink transmit filter associated with the source reference signal of the TCI state may apply to all of the SRS resources in the SRS resource set for various SRS options.

In some aspects, when a TCI state is of TCI state Type 1, and a source reference signal is associated with the TCI state of QCL-Type D, the source reference signal of the TCI state may be used to derive the uplink spatial filter for an associated transmission scheduled in all frequency bands (e.g., frequency bands both below and above 7 GHz) or only in certain qualified frequency bands (e.g., frequency band above 7 GHz only, FR1, FR2, FRx with higher frequency bands). In some aspects, QCL-Type D may not be used to derive an uplink spatial filter for FR1.

In some aspects, UE 520 may indicate which QCL type(s) UE 520 supports when using the SRS as the source reference signal. This may include QCL-Type D, or QCL-Type D in combination with QCL-Type A, QCL-Type B, and/or QCL-Type C.

As shown by reference number 535, UE 520 may receive, from BS 510, a configuration of TCI state types to use when using the SRS as the source reference signal. The configuration may indicate QCL types and SRS options. UE 520 may then transmit the SRS and configure beams with spatial filters that correspond to TCI states, in association with the UE capability indicated by UE 520. By indicating support for using the SRS as the source reference signal and by indicating support for specific TCI state types and QCL types, BS 510 and UE 520 may better coordinate TCI states and spatial filters.

As indicated above, FIG. 5 is provided as an example. Other examples may differ from what is described with regard to FIG. 5.

Figure 6:
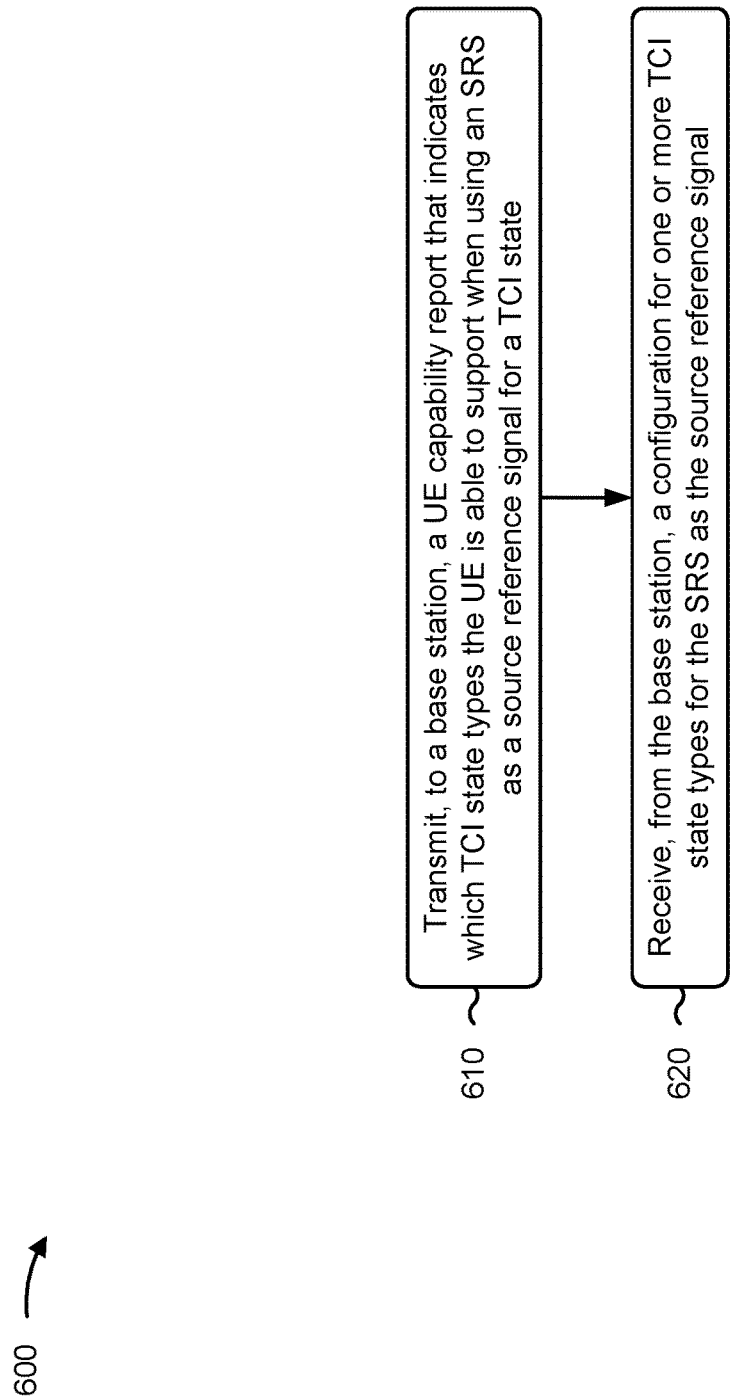
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., a UE 120 depicted in FIGS. 1-2 and 4, UE 520 depicted in FIG. 5) performs operations associated with indicating TCI state types for an SRS that is used as a source reference signal.

As shown in FIG. 6, in some aspects, process 600 may include transmitting, to a base station, a UE capability report that indicates which TCI state types the UE is able to support when using an SRS as a source reference signal for a TCI state (block 610). For example, the UE (e.g., using transmission component 804 depicted in FIG. 8) may transmit, to a base station, a UE capability report that indicates which TCI state types the UE is able to support when using an SRS as a source reference signal for a TCI state, as described above.

As further shown in FIG. 6, in some aspects, process 600 may include receiving, from the base station, a configuration for one or more TCI state types for the SRS as the source reference signal based at least in part on transmitting the UE capability report (block 620). For example, the UE (e.g., using reception component 802 depicted in FIG. 8) may receive, from the base station, a configuration for one or more TCI state types for the SRS as the source reference signal based at least in part on transmitting the UE capability report, as described above.

Process 600 may include additional aspects, such as any single aspect or any combination of aspects described below and/or in connection with one or more other processes described elsewhere herein.

In a first aspect, the one or more TCI state types include a Type 1 TCI state that indicates a common beam between the UE and the base station for one or more downlink channels or reference signals and one or more uplink channels or reference signals.

In a second aspect, alone or in combination with the first aspect, the one or more TCI state types include a Type 2 TCI state that indicates a common beam between the UE and the base station for more than one downlink channel or reference signal.

In a third aspect, alone or in combination with one or more of the first and second aspects, the one or more TCI state types include a Type 3 TCI state that indicates a common beam between the UE and the base station for more than one uplink channel or reference signal.

In a fourth aspect, alone or in combination with one or more of the first through third aspects, the one or more TCI state types include a Type 4 TCI state that indicates a beam between the UE and the base station for a single downlink channel or reference signal.

In a fifth aspect, alone or in combination with one or more of the first through fourth aspects, the one or more TCI state types include a Type 5 TCI state that indicates a beam between the UE and the base station for a single uplink channel or reference signal.

In a sixth aspect, alone or in combination with one or more of the first through fifth aspects, the UE capability report indicates whether the UE is able to support all TCI state types.

In a seventh aspect, alone or in combination with one or more of the first through sixth aspects, the UE capability report indicates whether the UE is able to support all TCI state types via a beam correspondence report.

In an eighth aspect, alone or in combination with one or more of the first through seventh aspects, the UE capability report indicates one or more options for the SRS when the SRS is used as the source reference signal.

In a ninth aspect, alone or in combination with one or more of the first through eighth aspects, the one or more options include one or more of beam management, codebook, non-codebook, or antenna switching.

In a tenth aspect, alone or in combination with one or more of the first through ninth aspects, the UE capability report indicates one or more QCL types.

In an eleventh aspect, alone or in combination with one or more of the first through tenth aspects, the one or more QCL types include QCL-Type D only.

In a twelfth aspect, alone or in combination with one or more of the first through eleventh aspects, the one or more QCL types include QCL-Type D and one or more of QCL-Type A, QCL-Type B, or QCL-Type C.

In a thirteenth aspect, alone or in combination with one or more of the first through twelfth aspects, the UE capability report is transmitted in an RRC message as part of a UE capability exchange.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
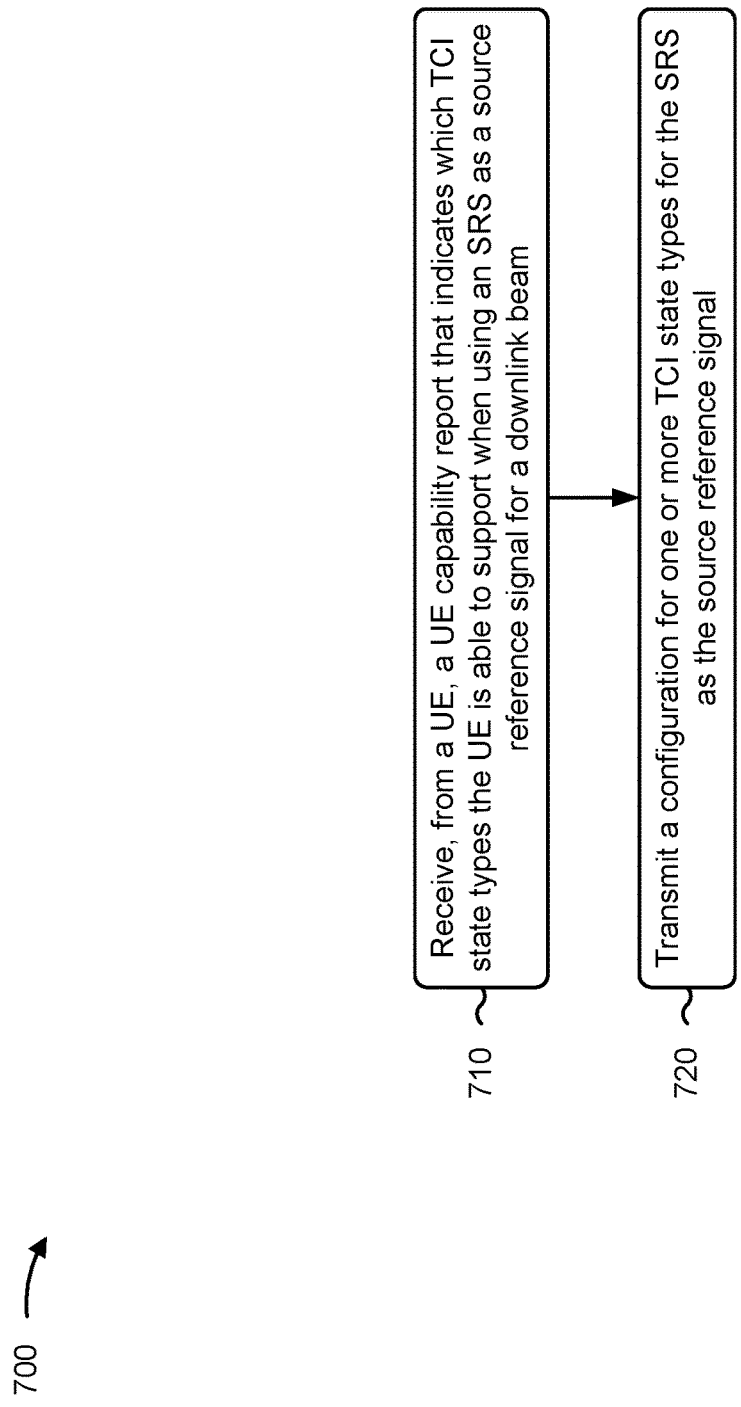
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., a base station 110 depicted in FIGS. 1-2 and 4, BS 510 depicted in FIG. 5) performs operations associated with indicating TCI state types for an SRS that is used as a source reference signal.

As shown in FIG. 7, in some aspects, process 700 may include receiving, from a UE, a UE capability report that indicates which TCI state types the UE is able to support when using an SRS as a source reference signal for a downlink beam (block 710). For example, the base station (e.g., using reception component 902 depicted in FIG. 9) may receive, from a UE, a UE capability report that indicates which TCI state types the UE is able to support when using an SRS as a source reference signal for a downlink beam, as described above.

As further shown in FIG. 7, in some aspects, process 700 may include transmitting a configuration for one or more TCI state types for the SRS as the source reference signal based at least in part on the UE capability report (block 720). For example, the base station (e.g., using transmission component 904 depicted in FIG. 9) may transmit a configuration for one or more TCI state types for the SRS as the source reference signal based at least in part on the UE capability report, as described above.

Process 700 may include additional aspects, such as any single aspect or any combination of aspects described below and/or in connection with one or more other processes described elsewhere herein.

In a first aspect, the one or more TCI state types include a Type 1 TCI state that indicates a common beam between the UE and the base station for one or more downlink channels or reference signals and one or more uplink channels or reference signals.

In a second aspect, alone or in combination with the first aspect, the one or more TCI state types include a Type 2 TCI state that indicates a common beam between the UE and the base station for more than one downlink channel or reference signal.

In a third aspect, alone or in combination with one or more of the first and second aspects, the one or more TCI state types include a Type 3 TCI state that indicates a common beam between the UE and the base station for more than one uplink channel or reference signal.

In a fourth aspect, alone or in combination with one or more of the first through third aspects, the one or more TCI state types include a Type 4 TCI state that indicates a beam between the UE and the base station for a single downlink channel or reference signal.

In a fifth aspect, alone or in combination with one or more of the first through fourth aspects, the one or more TCI state types include a Type 5 TCI state that indicates a beam between the UE and the base station for a single uplink channel or reference signal.

In a sixth aspect, alone or in combination with one or more of the first through fifth aspects, the UE capability report indicates one or more options for the SRS when the SRS is used as the source reference signal.

In a seventh aspect, alone or in combination with one or more of the first through sixth aspects, the one or more options include one or more of beam management, codebook, non-codebook, or antenna switching.

In an eighth aspect, alone or in combination with one or more of the first through seventh aspects, the UE capability report indicates one or more QCL types.

In a ninth aspect, alone or in combination with one or more of the first through eighth aspects, the one or more QCL types include QCL-Type D only.

In a tenth aspect, alone or in combination with one or more of the first through ninth aspects, the one or more QCL types include QCL-Type D and one or more of QCL-Type A, QCL-Type B, or QCL-Type C.

In an eleventh aspect, alone or in combination with one or more of the first through tenth aspects, the UE capability report is received in an RRC message as part of a UE capability exchange.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
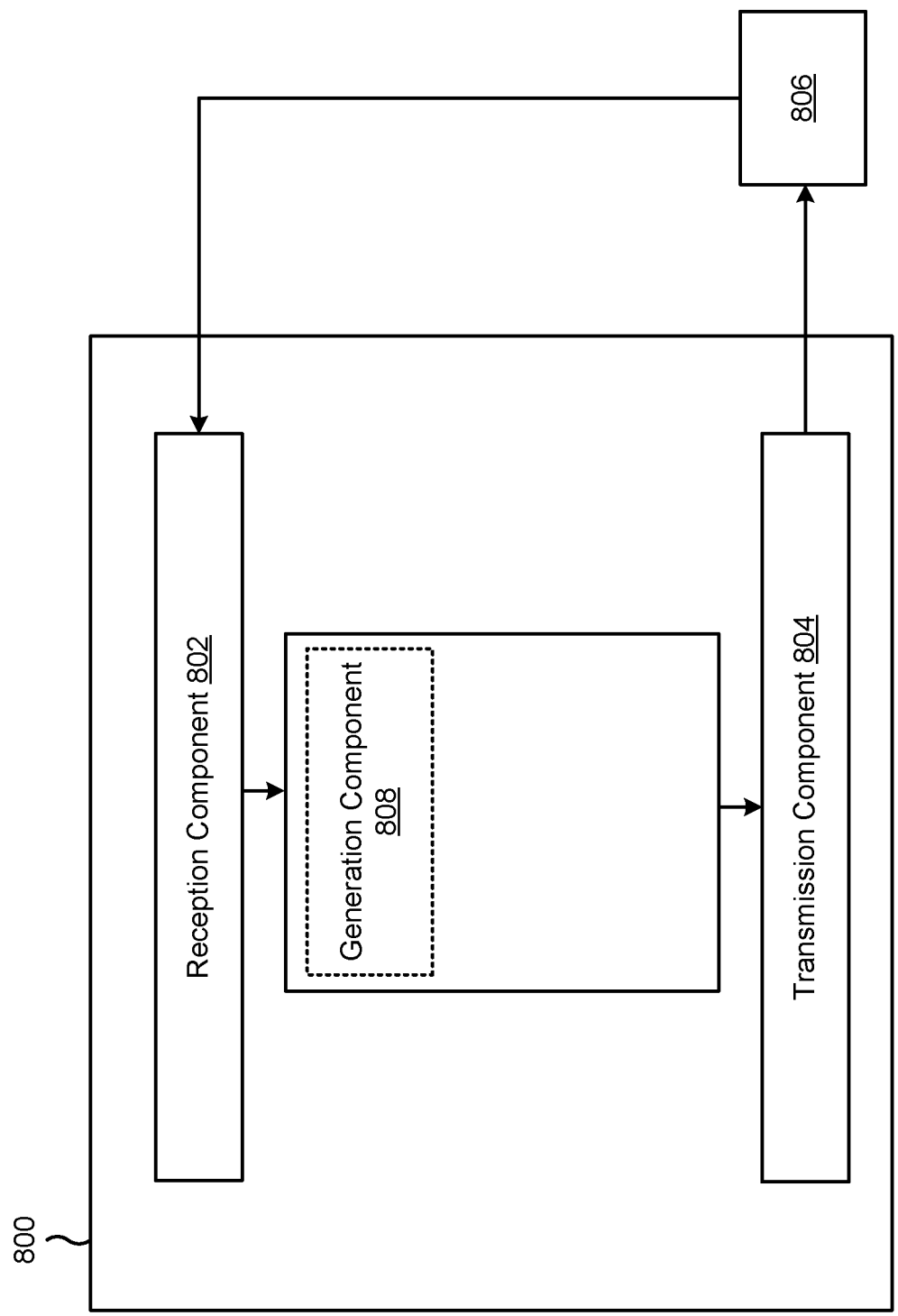
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a generation component 808, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The generation component 808 may generate a UE capability report based at least in part on a capability of the UE, a complexity of the UE, beam conditions, and/or a status of the UE. The UE capability report may indicate which TCI state types the UE is able to support when using an SRS as a source reference signal for a TCI state. The transmission component 804 may transmit, to a base station, the UE capability report. The reception component 802 may receive, from the base station, a configuration for one or more TCI state types for the SRS as the source reference signal based at least in part on transmitting the UE capability report.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
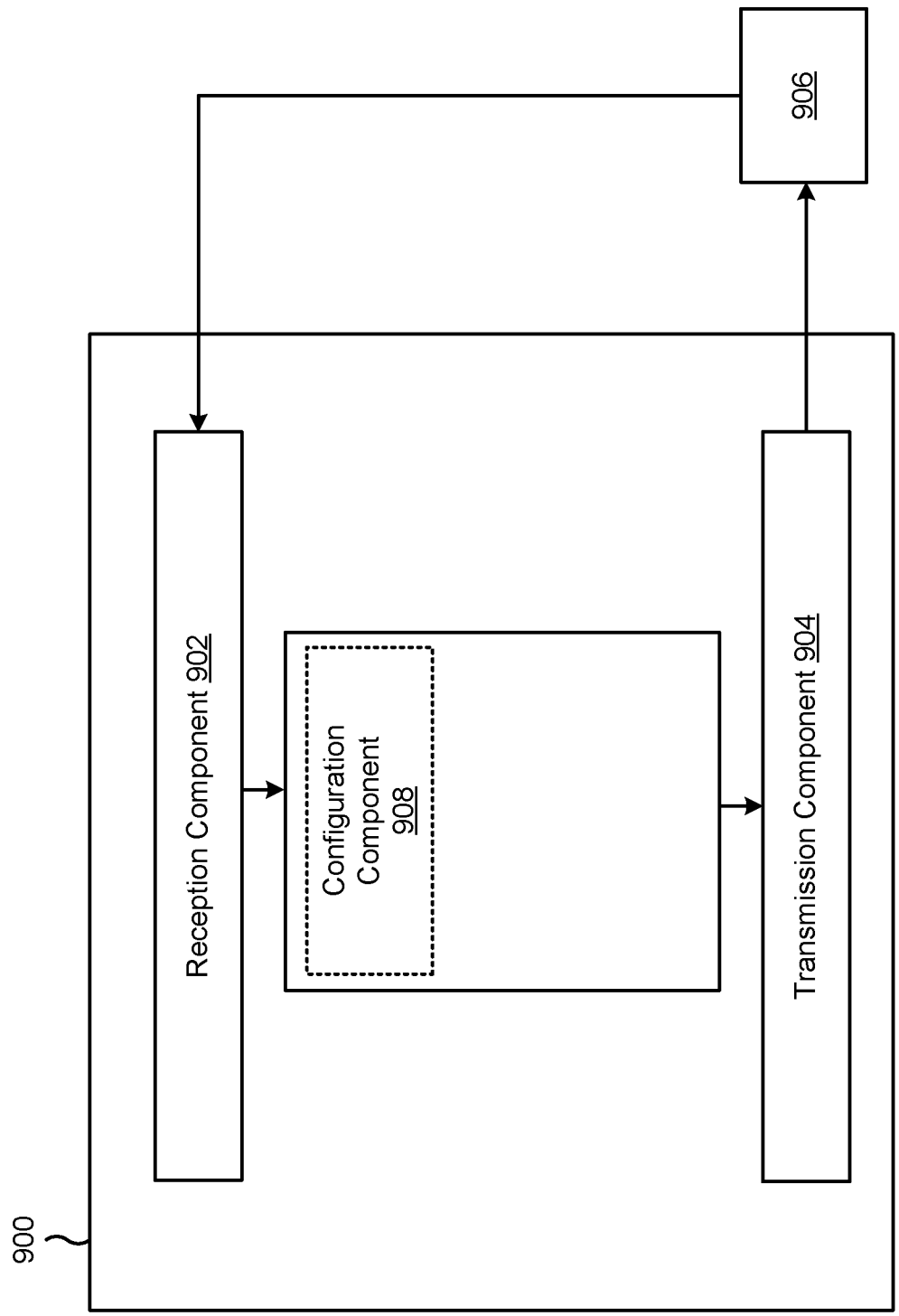

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a configuration component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, a UE capability report that indicates which TCI state types the UE is able to support when using an SRS as a source reference signal for a downlink beam. The configuration component 908 may generate a configuration for the UE that indicates one or more TCI state types for the SRS as the source reference signal based at least in part on the UE capability report, other UEs in the area, beam conditions, and/or traffic conditions. The transmission component 904 may transmit the configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: transmitting, to a base station, a UE capability report that indicates which transmission configuration indicator (TCI) state types the UE is able to support when using a sounding reference signal (SRS) as a source reference signal for a TCI state; and receiving, from the base station, a configuration for one or more TCI state types for the SRS as the source reference signal based at least in part on transmitting the UE capability report.

Aspect 2: The method of Aspect 1, wherein the one or more TCI state types include a Type 1 TCI state that indicates a common beam between the UE and the base station for one or more downlink channels or reference signals and one or more uplink channels or reference signals.

Aspect 3: The method of Aspect 1 or 2, wherein the one or more TCI state types include a Type 2 TCI state that indicates a common beam between the UE and the base station for more than one downlink channel or reference signal.

Aspect 4: The method of any of Aspects 1-3, wherein the one or more TCI state types include a Type 3 TCI state that indicates a common beam between the UE and the base station for more than one uplink channel or reference signal.

Aspect 5: The method of any of Aspects 1-4, wherein the one or more TCI state types include a Type 4 TCI state that indicates a beam between the UE and the base station for a single downlink channel or reference signal.

Aspect 6: The method of any of Aspects 1-5, wherein the one or more TCI state types include a Type 5 TCI state that indicates a beam between the UE and the base station for a single uplink channel or reference signal.

Aspect 7: The method of any of Aspects 1-6, wherein the UE capability report indicates whether the UE is able to support all TCI state types.

Aspect 8: The method of Aspect 7, wherein the UE capability report indicates whether the UE is able to support all TCI state types via a beam correspondence report.

Aspect 9: The method of any of Aspects 1-8, wherein the UE capability report indicates one or more options for the SRS when the SRS is used as the source reference signal.

Aspect 10: The method of Aspect 9, wherein the one or more options include one or more of beam management, codebook, non-codebook, or antenna switching.

Aspect 11: The method of any of Aspects 1-10, wherein the UE capability report indicates one or more quasi-co-location (QCL) types.

Aspect 12: The method of Aspect 11, wherein the one or more QCL types include QCL-Type D only.

Aspect 13: The method of Aspect 11, wherein the one or more QCL types include QCL-Type D and one or more of QCL-Type A, QCL-Type B, or QCL-Type C.

Aspect 14: The method of Aspect 11, wherein the UE capability report is transmitted in a radio resource control message as part of a UE capability exchange.

Aspect 15: A method of wireless communication performed by a base station, comprising: receiving, from a user equipment (UE), a UE capability report that indicates which transmission configuration indicator (TCI) state types the UE is able to support when using a sounding reference signal (SRS) as a source reference signal for a downlink beam; and transmitting a configuration for one or more TCI state types for the SRS as the source reference signal based at least in part on the UE capability report.

Aspect 16: The method of Aspect 15, wherein the one or more TCI state types include a Type 1 TCI state that indicates a common beam between the UE and the base station for one or more downlink channels or reference signals and one or more uplink channels or reference signals.

Aspect 17: The method of Aspect 15 or 16, wherein the one or more TCI state types include a Type 2 TCI state that indicates a common beam between the UE and the base station for more than one downlink channel or reference signal.

Aspect 18: The method of any of Aspects 15-17, wherein the one or more TCI state types include a Type 3 TCI state that indicates a common beam between the UE and the base station for more than one uplink channel or reference signal.

Aspect 19: The method of any of Aspects 15-18, wherein the one or more TCI state types include a Type 4 TCI state that indicates a beam between the UE and the base station for a single downlink channel or reference signal.

Aspect 20: The method of any of Aspects 15-19, wherein the one or more TCI state types include a Type 5 TCI state that indicates a beam between the UE and the base station for a single uplink channel or reference signal.

Aspect 21: The method of any of Aspects 15-20, wherein the UE capability report indicates one or more options for the SRS when the SRS is used as the source reference signal.

Aspect 22: The method of Aspect 21, wherein the one or more options include one or more of beam management, codebook, non-codebook, or antenna switching.

Aspect 23: The method of any of Aspects 15-22, wherein the UE capability report indicates one or more quasi-co-location (QCL) types.

Aspect 24: The method of Aspect 23, wherein the one or more QCL types include QCL-Type D only.

Aspect 25: The method of Aspect 23, wherein the one or more QCL types include QCL-Type D and one or more of QCL-Type A, QCL-Type B, or QCL-Type C.

Aspect 26: The method of Aspect 23, wherein the UE capability report is received in a radio resource control message as part of a UE capability exchange.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the memory and the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
     transmit, to a base station, a UE capability report that indicates which transmission configuration indicator (TCI) state types the UE is able to support when using a sounding reference signal (SRS) as a source reference signal for a TCI state, wherein the UE capability report indicates which one or more of a beam management SRS option, a codebook SRS option, a non-codebook SRS option, or an antenna switching SRS option the UE can use as the source reference signal; and
     receive, from the base station, a configuration for one or more TCI state types for the SRS as the source reference signal based at least in part on transmitting the UE capability report.

2. The UE of claim 1, wherein the one or more TCI state types include a Type 1 TCI state that indicates a common beam between the UE and the base station for one or more downlink channels or reference signals and one or more uplink channels or the reference signals.

3. The UE of claim 1, wherein the one or more TCI state types include a Type 2 TCI state that indicates a common beam between the UE and the base station for more than one downlink channel or reference signal.

4. The UE of claim 1, wherein the one or more TCI state types include a Type 3 TCI state that indicates a common beam between the UE and the base station for more than one uplink channel or reference signal.

5. The UE of claim 1, wherein the one or more TCI state types include a Type 4 TCI state that indicates a beam between the UE and the base station for a single downlink channel or reference signal.

6. The UE of claim 1, wherein the one or more TCI state types include a Type 5 TCI state that indicates a beam between the UE and the base station for a single uplink channel or reference signal.

7. The UE of claim 1, wherein the UE capability report indicates whether the UE is able to support all TCI state types.

8. The UE of claim 7, wherein the UE capability report indicates whether the UE is able to support all TCI state types via a beam correspondence report.

9. The UE of claim 1, wherein the UE capability report indicates one or more quasi-co-location (QCL) types.

10. The UE of claim 9, wherein the one or more QCL types include QCL-Type D only.

11. The UE of claim 9, wherein the one or more QCL types include QCL-Type D and one or more of QCL-Type A, QCL-Type B, or QCL-Type C.

12. The UE of claim 1, wherein the one or more processors are configured to transmit the UE capability report in a radio resource control message as part of a UE capability exchange.

13. A base station for wireless communication, comprising:
one or more memories; and
one or more processors coupled to the one or more memories, the one or more processors configured to:
receive, from a user equipment (UE), a UE capability report that indicates which transmission configuration indicator (TCI) state types the UE is able to support when using a sounding reference signal (SRS) as a source reference signal for a downlink beam, wherein the UE capability report indicates which one or more of a beam management SRS option, a codebook SRS option, a non-codebook SRS option, or an antenna switching SRS option the UE can use as the source reference signal; and
transmit a configuration for one or more TCI state types for the SRS as the source reference signal based at least in part on the UE capability report.

14. The base station of claim 13, wherein the one or more TCI state types include a Type 1 TCI state that indicates a common beam between the UE and the base station for one or more downlink channels or reference signals and one or more uplink channels or the reference signals.

15. The base station of claim 13, wherein the one or more TCI state types include a Type 2 TCI state that indicates a common beam between the UE and the base station for more than one downlink channel or reference signal.

16. The base station of claim 13, wherein the one or more TCI state types include a Type 3 TCI state that indicates a common beam between the UE and the base station for more than one uplink channel or reference signal.

17. The base station of claim 13, wherein the one or more TCI state types include a Type 4 TCI state that indicates a beam between the UE and the base station for a single downlink channel or reference signal.

18. The base station of claim 13, wherein the one or more TCI state types include a Type 5 TCI state that indicates a beam between the UE and the base station for a single uplink channel or reference signal.

19. The base station of claim 13, wherein the UE capability report indicates one or more quasi-co-location (QCL) types.

20. The base station of claim 19, wherein the one or more QCL types include QCL-Type D only.

21. The base station of claim 19, wherein the one or more QCL types include QCL-Type D and one or more of QCL-Type A, QCL-Type B, or QCL-Type C.

22. The base station of claim 13, wherein the UE capability report is received in a radio resource control message as part of a UE capability exchange.

23. A method of wireless communication performed by a user equipment (UE), comprising:
transmitting, to a base station, a UE capability report that indicates which transmission configuration indicator (TCI) state types the UE is able to support when using a sounding reference signal (SRS) as a source reference signal for a TCI state, wherein the UE capability report indicates which one or more of a beam management SRS option, a codebook SRS option, a non-codebook SRS option, or an antenna switching SRS option the UE can use as the source reference signal; and
receiving, from the base station, a configuration for one or more TCI state types for the SRS as the source reference signal based at least in part on transmitting the UE capability report.

24. The method of claim 23, wherein the one or more TCI state types include a Type 1 TCI state that indicates a common beam between the UE and the base station for one or more downlink channels or reference signals and one or more uplink channels or the reference signals.

25. The method of claim 23, wherein the one or more TCI state types include a Type 2 TCI state that indicates a common beam between the UE and the base station for more than one downlink channel or reference signal.

26. The method of claim 23, wherein the one or more TCI state types include a Type 3 TCI state that indicates a common beam between the UE and the base station for more than one uplink channel or reference signal.

27. The method of claim 23, wherein the one or more TCI state types include a Type 4 TCI state that indicates a beam between the UE and the base station for a single downlink channel or reference signal.

28. The method of claim 23, wherein the one or more TCI state types include a Type 5 TCI state that indicates a beam between the UE and the base station for a single uplink channel or reference signal.

29. The method of claim 23, wherein the UE capability report indicates whether the UE is able to support all TCI state types.

30. A method of wireless communication performed by a base station, comprising:
receiving, from a user equipment (UE), a UE capability report that indicates which transmission configuration indicator (TCI) state types the UE is able to support when using a sounding reference signal (SRS) as a source reference signal for a downlink beam, wherein the UE capability report indicates which one or more of a beam management SRS option, a codebook SRS option, a non-codebook SRS option, or an antenna switching SRS option the UE can use as the source reference signal; and
transmitting a configuration for one or more TCI state types for the SRS as the source reference signal based at least in part on the UE capability report.

* * * * *